(No Model.) 2 Sheets—Sheet 1.

J. ANDERSON.
GLASS FURNACE.

No. 315,694. Patented Apr. 14, 1885.

Witnesses
W. S. Corwin
J. A. Burns

Inventor
Joseph Anderson
by his attys
Bakewell & Kerr (No Model.) 2 Sheets—Sheet 2.

J. ANDERSON.
GLASS FURNACE.

No. 315,694. Patented Apr. 14, 1885.

Witnesses
W. B. Corwin
J. A. Burns.

Inventor
Joseph Anderson
by his atty's
Bakewell & Kerr

UNITED STATES PATENT OFFICE.

JOSEPH ANDERSON, OF PITTSBURG, PENNSYLVANIA.

GLASS-FURNACE.

SPECIFICATION forming part of Letters Patent No. 315,694, dated April 14, 1885.

Application filed July 11, 1884. (No model.)

*To all whom it may concern:*

Be it known that I, JOSEPH ANDERSON, of Pittsburg, in the county of Allegheny and State of Pennsylvania, have invented a new and useful Improvement in Glass-Furnaces; and I do hereby declare the following to be a full, clear, and exact description thereof.

My improvement relates, particularly, to the construction of glass-melting furnaces designed for use with gas, and more especially natural gas.

Figure 1:
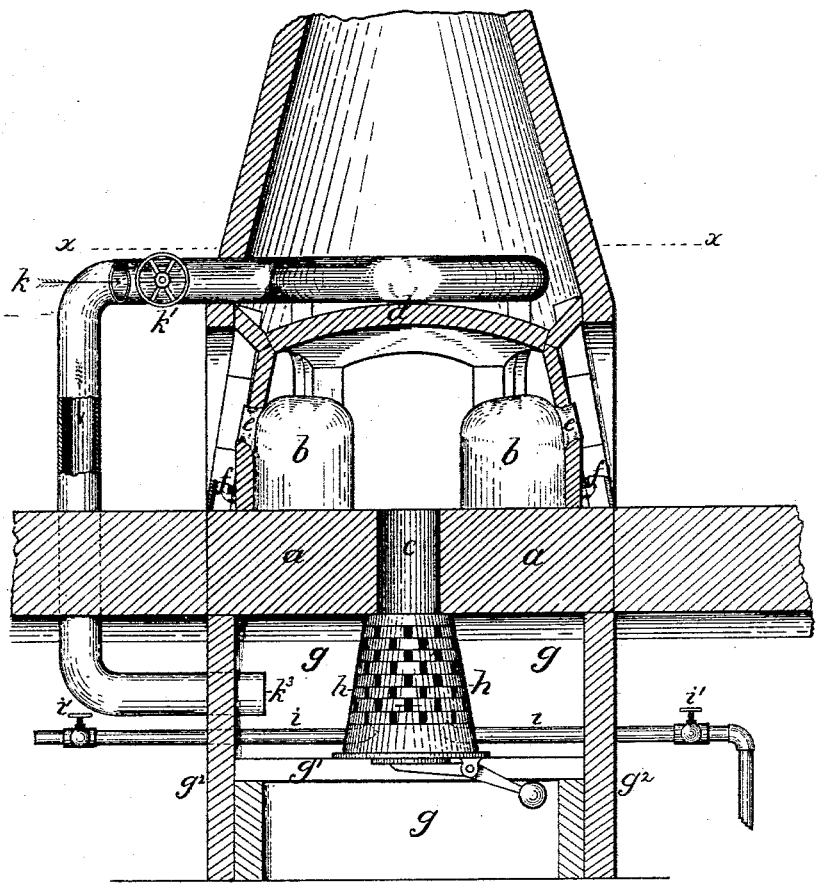
Figure 2:
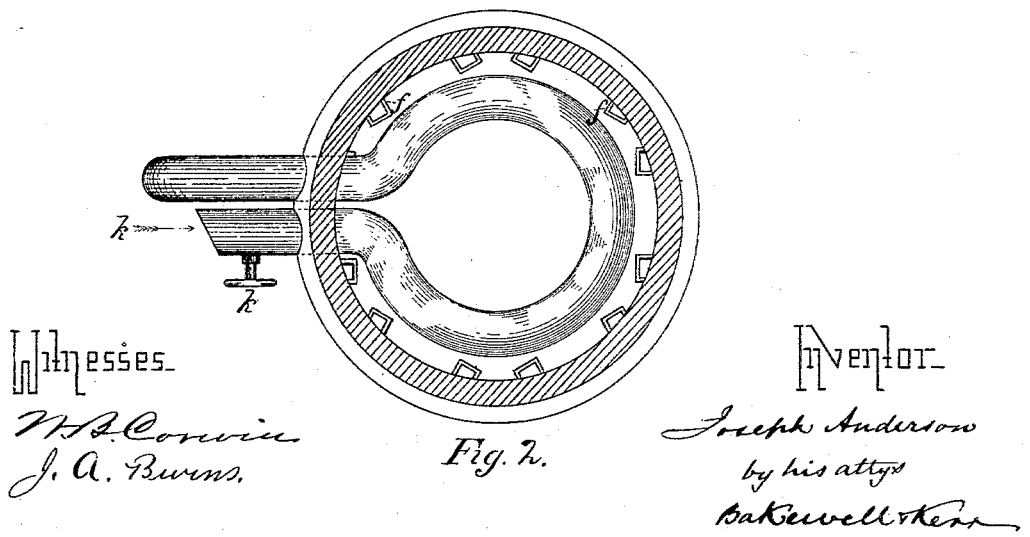
Figure 3:
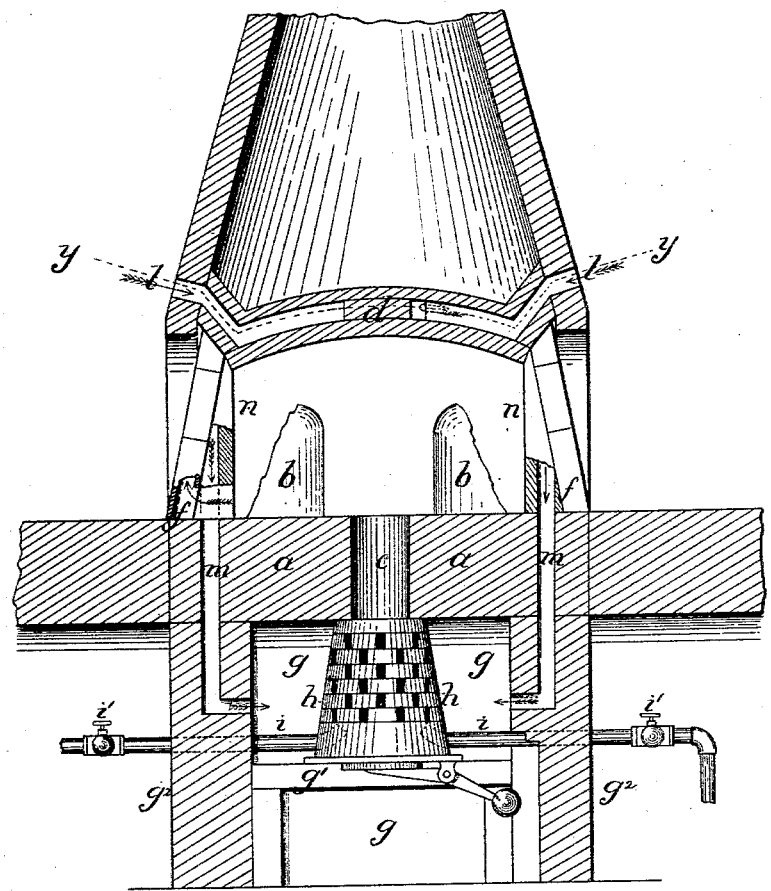
Figure 4:
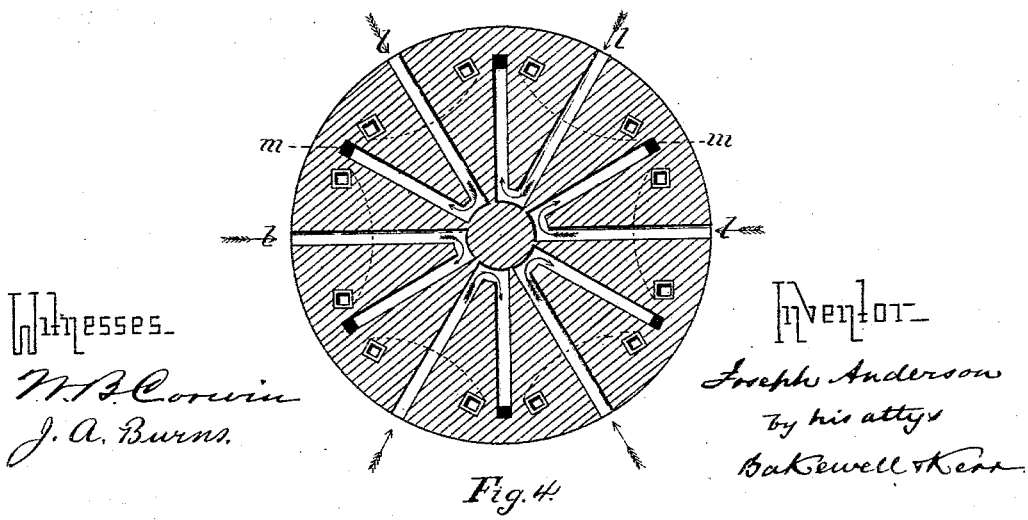

In illustrating my invention I have taken the old form of pot-furnace, and in Figure 1 of the drawings I show by a vertical section how my improvement may be applied to existing furnaces. In Fig. 2 I show a horizontal section on the line $x\ x$ of Fig. 1. Fig. 3 is a vertical section of a furnace constructed in accordance with my improvement. Fig. 4 is a cross-section on the line $y\ y$ of Fig. 3.

Like letters of reference indicate like parts in each.

The furnace has the usual bench, $a$, for supporting the pots $b$, eye $c$, crown $d$, work-holes $e$, and flues $f$.

Below the bench $a$, I construct a chamber, $g$, in which, at any suitable height, I put an arch or floor, $g'$.

On the floor $g'$, I construct a hollow pyramid or column of checker-work, $h$, formed of fire-brick, of any suitable shape and arrangement. The chamber $g$ is closed to prevent the entrance of cold air from the outside.

Leading through the walls $g^2$ to the base of the checker-work $h$ is a gas pipe or pipes, $i$, controlled by suitable valves, $i'$. Upon the crown $d$ of the furnace is a ring or coil of pipe having an open outer end, $k$, which is controlled by a valve, $k'$. This pipe extends down along the side of the furnace, either outside or in the wall, and passes through the wall $g^2$ of the chamber $g$ and opens into said chamber, as shown at $k^3$.

If desired, the ring $k$ may be provided with any number of branch pipes extending from it down to the chamber $g$. The purpose of this construction is to obtain the heating of the air in the trunk or pipe $k$, which is exposed to the intense heat that is found in the crown of the furnace, and then conduct the air so heated into the chamber $g$, whence it passes through the interstices of the checker-work $h$, and there meets and mingles with the gas from the pipes $i$, bursting into an intense combustion in the eye $c$. The joints between the walls of the furnace and the necks of the pots $b$ are properly luted or cemented to prevent the entrance of the air at that point, so that the only air which is supplied to the furnace is obtained through the pipe or pipes $k$. As before stated, this construction is specially adapted for use in furnaces which are already erected.

I do not limit myself to any particular form and arrangement of the trunk $k$ in or on the crown of the furnace.

In Figs. 3 and 4 I show a new furnace as it would be constructed to embody my improvement. In the crown $d$, I build a number of air-entrant flues, $l$, extending through the walls of the furnace and reaching in toward the center of the crown. Here they connect with other flues, $m$, which lead upward to the pillars $n$, which support the crown of the furnace. The flues $m$ then descend through the pillars $n$, bench $a$, and walls $g^2$, and open into the hot-air chamber $g$, as shown in Fig. 3. Otherwise the furnace shown in Figs. 3 and 4 is similar to the one shown in Figs. 1 and 2.

The operation of the furnace is as follows: Gas is supplied through the pipes $i$, as before stated, and the air is drawn by the draft of the stack of the furnace into the air-chamber $g$ through the flues $l$ and $m$, being heated in its passage through the crown $d$, pillars $n$, and walls $g^2$, so that it enters the chamber $g$ at a high temperature and in a condition to produce a proper combustion of the gas.

I do not limit myself to any particular formation and arrangement of the flues $l$ and $m$, as they may be arranged to circulate in and through the crown $d$ in any desired manner.

My invention has the advantage of not necessitating any modification of the melting-furnace now in common use, and, as has been particularly stated, is capable of being applied thereto, and that at little expense.

I am aware that it is old in a glass-furnace to have an air-heating pipe extend vertically down through the stack-chamber at the side of the crown and through the side wall to a closed chamber below the eye, where it discharges below a coal-grate in the eye. This differs from my invention in that my air-heating pipe is arranged in or on the crown, so that the air may be sufficiently heated to burn natural gas, which is not the case in the furnace mentioned above, where the vertical air-pipe extends merely through the edge of the stack-chamber and near the wall. It also differs from my furnace in that it has no provision for supplying and burning gas, and is not intended for that purpose.

I am also aware that furnaces having pipes for supplying and burning natural gas, with air-heating flues arranged in the walls of the eye of the furnace, are not new; but I claim none of these things, my invention being limited to the combination and arrangement of the parts shown and described in my foregoing specification, whereby I am enabled to adapt the ordinary form of crown-furnace to the proper combustion of natural gas.

This improvement, while applicab'e to use with purified, manufactured, and similar gas, is especially designed for use with natural gas, and constitutes a cheap and effective manner of adapting existing furnaces, without expensive modifications of construction, to its use.

Practical experience has demonstrated that in order to obtain the proper and complete combustion of the constituents of natural gas it must be brought to the point of combustion in a cold state and there be mingled with a very much greater volume of air which is very highly heated—say, upward to 2,000° Fahrenheit. I obtain these conditions in a simple and effective way by means of the construction shown and described in this application, and have the furnace in successful operation with natural gas.

What I claim as my invention, and desire to secure by Letters Patent, is—

1. In a glass-melting or similar furnace, the combination of a close chamber arranged under the bench, with air-heating flues arranged in or upon the crown and discharging in the said close air-chamber, and a gas pipe or pipes also discharging in said chamber, whereby said furnace is adapted to burn natural gas, substantially as and for the purposes described.

2. In a glass-melting or similar furnace provided with a close chamber below the bench and surrounding the eye, a hollow pile or column of checker-work arranged in the same, reaching into the lower end of the eye, a gas pipe or pipes discharging into the lower part of the checker-work, and air-heating flues discharging into the chamber surrounding said checker-work, substantially as and for the purposes described.

In testimony whereof I have hereunto set my hand this 8th day of July, A. D. 1884.

JOSEPH ANDERSON.

Witnesses:
W. B. CORWIN,
THOMAS W. BAKEWELL.